United States Patent
Kaindl et al.

(10) Patent No.: US 10,412,568 B2
(45) Date of Patent: Sep. 10, 2019

(54) PROVIDING AN AID MEANS AFTER A VEHICLE ACCIDENT

(71) Applicant: Bayerische Motoren Werke Aktiengesellschaft, Munich (DE)

(72) Inventors: Markus Kaindl, Neubiberg (DE); Michael Gruffke, Erding (DE); Ingrid Pilkington, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/888,908

(22) Filed: Feb. 5, 2018

(65) Prior Publication Data

US 2018/0176757 A1 Jun. 21, 2018

Related U.S. Application Data

(63) Continuation of application No. PCT/EP2016/067720, filed on Jul. 26, 2016.

(30) Foreign Application Priority Data

Aug. 11, 2015 (DE) .......... 10 2015 215 294

(51) Int. Cl.
*H04W 4/30* (2018.01)
*H04W 4/90* (2018.01)
(Continued)

(52) U.S. Cl.
CPC ............ *H04W 4/90* (2018.02); *G08B 25/016* (2013.01); *G08G 1/205* (2013.01);
(Continued)

(58) Field of Classification Search
CPC ......... H04W 4/44; H04W 4/90; H04W 76/50; H04W 3/5116; G08B 21/0476; G08B 25/016

See application file for complete search history.

(56) References Cited

U.S. PATENT DOCUMENTS

| 2004/0039503 | A1 | 2/2004 | Doyle |
| 2008/0132199 | A1 | 6/2008 | Hirata |

(Continued)

FOREIGN PATENT DOCUMENTS

| DE | 102 38 805 A1 | 3/2004 |
| DE | 10 2012 216 208 A1 | 5/2014 |

(Continued)

OTHER PUBLICATIONS

PCT/EP2016/067720, International Search Report dated Oct. 6, 2016 (Three (3) pages).

(Continued)

*Primary Examiner* — Andrew W Bee

(74) *Attorney, Agent, or Firm* — Crowell & Moring LLP

(57) ABSTRACT

A method for providing aid after a vehicle accident involving a vehicle includes establishing a wireless connection between the vehicle and a rescue center. First sensor data, which is ascertained via a first sensor in the vehicle, is transmitted to the rescue center, while second sensor data, detected by the first sensor and/or by a second sensor of the vehicle, is transmitted to and stored at a data storage unit independent of the rescue center. Contact information assigned to the data storage unit is transmitted from the vehicle to the rescue center via the wireless connection. The second sensor data and/or data derived therefrom stored in the data storage unit is retrieved by the rescue center using the contact information, where the retrieved data is usable to select aid appropriate to a type of the vehicle accident.

17 Claims, 1 Drawing Sheet

(51) Int. Cl.
  *G08B 25/01* (2006.01)
  *G08G 1/00* (2006.01)
  *H04W 76/50* (2018.01)
  *H04W 4/44* (2018.01)
  *B60R 21/00* (2006.01)
(52) U.S. Cl.
  CPC ....... *B60R 2021/0027* (2013.01); *H04W 4/44* (2018.02); *H04W 76/50* (2018.02)

(56) References Cited

U.S. PATENT DOCUMENTS

2010/0048159 A1  2/2010  Stenquist
2014/0300739 A1  10/2014 Mimar
2015/0111517 A1  4/2015  Kowalewski et al.

FOREIGN PATENT DOCUMENTS

EP        1 494 492 A1    1/2005
WO   WO 2004/057901 A1   7/2004

OTHER PUBLICATIONS

German Search Report issued in German counterpart application No. 10 2015 215 294.4 dated Apr. 19, 2016 (Eight (8) pages).

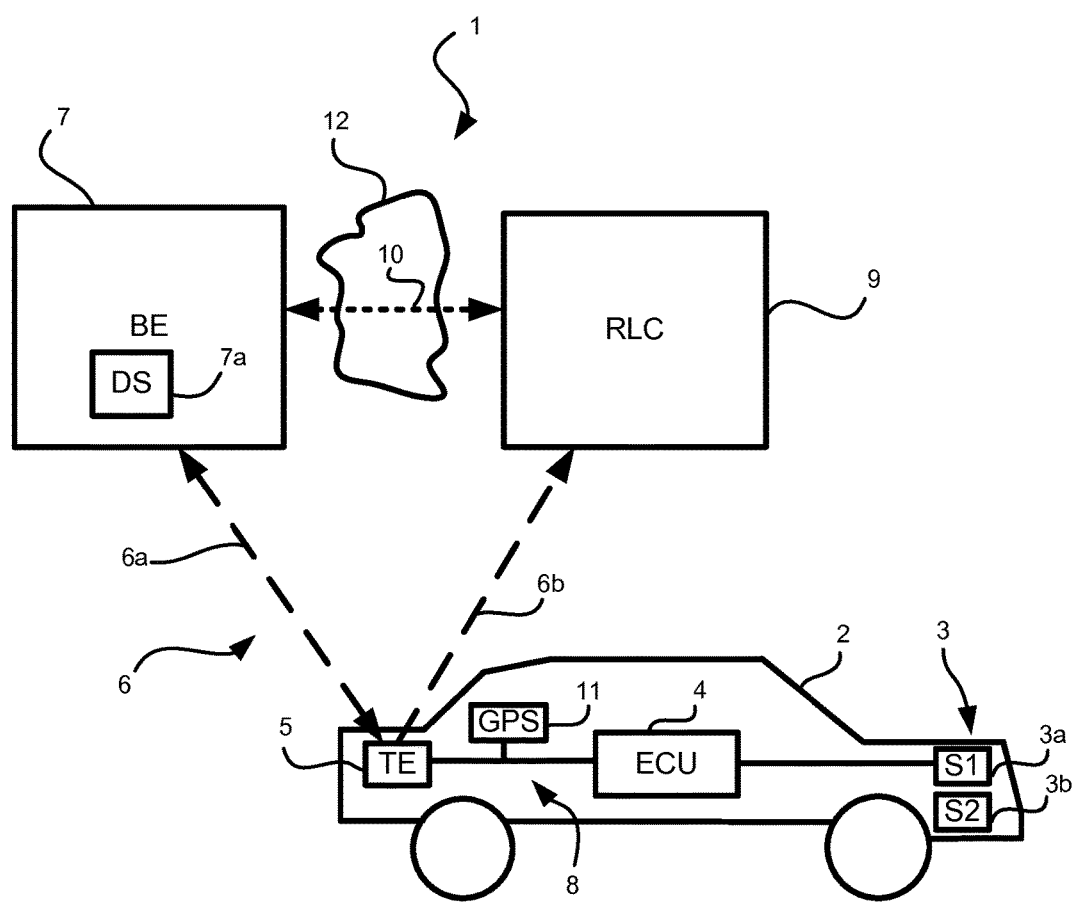

PROVIDING AN AID MEANS AFTER A VEHICLE ACCIDENT

CROSS REFERENCE TO RELATED APPLICATIONS

This application is a continuation of PCT International Application No. PCT/EP2016/067720, filed Jul. 26, 2016, which claims priority under 35 U.S.C. § 119 from German Patent Application No. 10 2015 215 294.4, filed Aug. 11, 2015, the entire disclosures of which are herein expressly incorporated by reference.

BACKGROUND AND SUMMARY OF THE INVENTION

The invention relates to a method for providing aid means after a vehicle accident. The invention further relates to a corresponding emergency call device for a vehicle, a vehicle equipped therewith and a corresponding system for providing the aid means. The invention also relates to a corresponding computer program product.

After a vehicle accident it is important to provide the correct aid means within as short a time as possible, in order to help the persons involved in the accident, to handle the vehicle involved in the accident in a suitable manner, to record accident data, if applicable to control the traffic at the accident site, etc. In order to enable this, rescue centers have been created, which for example in Europe under the unitary Euro emergency number 112 professionally coordinate all the assistance services for example of rescue services, police, fire department etc.

In the area of the European Union in addition a standardized electronic emergency call system will be introduced for motor vehicles under the name eCall. According to this system, predetermined accident-relevant data concerning the vehicle involved in the accident, which are detected by an emergency call device of the vehicle are transmitted by means of a cell telephone connection via the Euro emergency call number to the respective rescue center as soon as an accident situation is detected. The accident-relevant data comprise data which must be transmitted urgently in a so-called Minimum Data Set (MSD), for example data for the identification of the vehicle and position data which are obtained in the vehicle in a satellite-based manner using a suitable satellite system such as e.g. the Global Positioning System (GPS), Galileo or Egnos. The accident-relevant data comprise, furthermore, data which are representative of a predetermined vehicle class to which the vehicle involved in the accident is to be assigned. The accident-relevant data comprise, furthermore, data concerning the fuel type of the vehicle, the time of the accident and the direction of travel of the vehicle.

Optionally, further data can be transmitted within an eCall, for example data concerning on-board safety systems which are representative of the severity of the accident event, the number of occupants and/or whether the safety belts were being worn, whether the vehicle has overturned, etc. Such optional data can be defined with regard to their type, their content and their format in particular individually by a vehicle manufacturer.

In order to trigger an eCall, the accident situation is detected in particular automatically by means of a sensor which is functionally coupled to the triggering of an airbag in the vehicle. The cell telephone connection is then automatically established. The cell telephone connection can also be established manually, independently of the sensor, by pressing an emergency call button provided in the vehicle and thereupon the data can likewise be transmitted automatically from the vehicle to the rescue center. The mobile radio connection is configured on the basis of the Global System for Mobile Communications (GSM) System. It comprises both the possibility to transmit data and also to establish a voice connection. The data transmission takes place in particular in-band.

A system corresponding to the eCall system is provided for Russia, which transmits automatic emergency calls from a vehicle involved in an accident with position data of the vehicle to a rescue center, which are obtained using the Global Navigation Satellite System (GLONASS). This Russian emergency call system is known under the name ERA GLONASS. In this system, likewise accident-relevant data are transmitted automatically from a vehicle involved in an accident to a rescue center.

In the context of the Services Connected Drive offered by the applicant for accordingly equipped BMW vehicles, the applicant offers an emergency call system in which manually or automatically after an accident a voice- and data connection is established between the vehicle and a call center provided by BMW. In the process, in addition to position- and vehicle-related data such as e.g. the vehicle identification number, also data ascertained from vehicle sensors, for example data from acceleration sensors, are transmitted from the vehicle to the call center by means of a mobile radio interface. The data also comprise accident-relevant data.

From DE 102 38 805 A1 a device is known for the automatic generation of an emergency call, in which the position of the device is detected. If an emergency sensor detects an emergency, a mobile radio terminal then transmits a message which contains the detected position of the device. The device can be installed in a motor vehicle.

From EP 1 494 492 A1 a method and a device are known for the execution of emergency calls, in which data which contain emergency call information are transmitted by means of Dual Tone Multi Frequency (DTMF) communications via a voice connection established between the vehicle and an emergency call center.

The contents of the above-mentioned publications are herewith included into the present description by reference.

It is an object of the invention to make available, after a vehicle accident, as much accident-relevant data as possible to a rescue center which is informed by means of an automatic emergency call.

According to the invention, for providing aid means after a vehicle accident provision is made that by means of an emergency call device of the vehicle, after the accident, a wireless data and/or voice connection is automatically established between the vehicle and a rescue center. By means of at least one first sensor, first sensor data ascertained in the vehicle are transmitted in the process to the rescue center. Furthermore, second sensor data detected by the first sensor and/or by at least one second sensor provided in the vehicle are automatically transmitted to a data storage unit independent of the rescue center and are stored there. Via the wireless data and/or voice connection, contact information assigned to the data storage unit is transmitted from the vehicle to the rescue center. Using the contact information, the rescue center retrieves the second sensor data and/or data derived therefrom stored in the independent data storage unit. The retrieved data are suitable for selecting aid means appropriate to the accident type. To carry out the corresponding method steps, in particular a computer is provided at least on the part of the rescue center.

With the invention, it was recognized that within the context of the provided standardized emergency call systems only a relatively small amount of accident-relevant data are transmitted from the vehicle to the rescue center and that therefore it will scarcely be possible for the respective rescue centers to reliably process manufacturer-specific, optionally provided data for the variety of vehicle makes and models. Thereby, important data are possibly lost in the rescue chain, which may help to assist the persons and/or vehicles involved in the accident more quickly and/or better.

Furthermore, with the invention it was recognized that such an information gap can be closed on the part of the rescue center if it has at its disposal a relatively simple tool, by which it can retrieve additional, manufacturer-specific accident-relevant data concerning a vehicle accident. With the invention it is made possible in particular that it can retrieve these data from the manufacturer's data storage unit via a standardized data interface in a commercially available computer. Thereby, practically no adaptation problems arise at this interface. In particular, the interface can be a conventional computer network interface, which is accessible e.g. with an internet browser.

The corresponding communication information can then comprise in particular an http address, an https address, an IP address or a Uniform Resource Locator (URL), which identifies a respective resource via which the data storage unit is able to be contacted.

With the invention in particular an extension of a standardized emergency call such as eCall or ERA GLONASS can take place to the effect that additional data are made available to a rescue center. For this, with the invention advantageously a second data transmission channel can be made available, supplementary to the standardized emergency call data transmission channel.

The first sensor data ascertained by means of the at least one first sensor can comprise, in particular, data concerning the location of the vehicle, such as for example coordinates based by means of a GPS sensor. The data transmitted to the rescue center can, however, also comprise further data such as vehicle identification data, time of accident, etc.

The first and/or second sensor data are generated in particular before, during or after the time of the accident and in particular in the course of events of the accident. The respective sensors are, in particular, permanently installed in the vehicle.

The type of accident can be characterized by means of one or more parameters, for example by a parameter which indicates the severity of the accident, for example in three stages minor/medium/severe, and/or by a parameter which is characteristic as to whether several vehicles and/or several persons are involved in the accident.

The data storage unit can be provided in particular in a data processing center with a so-called backend server, which is operated by the vehicle manufacturer of the vehicle involved in the accident directly or indirectly by means of a service provider at a respective operation site which lies at a different location to the rescue center. The backend server is configured here so that it regularly exchanges data with a variety of vehicles of the vehicle manufacturer and in particular retrieves or respectively receives data from the vehicles.

According to an advantageous example embodiment of the invention, at least the second sensor data are processed in a data processing unit so that the accident is assigned to at least one of several predetermined accident types, for example a rear-end accident, a head-on collision, an accident in town, on a highway or on a freeway, an accident with an overturned vehicle, an accident with injury to persons, an accident with pedestrian involvement, an accident in which the vehicle is still roadworthy or is no longer roadworthy, etc. The second sensor data, the data derived therefrom or further data transmitted from the vehicle can indicate how many occupants were in the vehicle at the time of the accident, whether they are responsive or unconscious, etc.

The at least one second sensor is in particular an accident sensor (crash sensor). It can detect in particular speed values, acceleration values and/or deformation values, e.g. on bodywork parts. With the respective sensor for example it can be detected how many persons and/or vehicles are involved in the accident. Several sensors may be provided, for example an optical, a mechanical and/or an acoustic sensor. In particular, a camera can be provided as a sensor.

The second sensor data can be processed in a data processing unit so that the severity of the accident is assigned to one of several degrees of severity. For the assigning of an accident type, further data can also be provided, retrieved from a data source and/or processed, for example from a navigation system or from a database. The corresponding data processing takes place preferably entirely or partially in the backend server, but it can also take place entirely or partially in the vehicle and/or in a computer of the rescue center or in another computer.

The values or respectively information occurring respectively in the course of the data processing can be provided for output for example in the data storage unit. In particular, they can be retrieved from the data storage unit by the rescue center. They can be outputted on a, for example, optical and/or acoustic output device, for example on a screen, on a head-mounted display and/or on a loudspeaker.

The data source does not have to be installed in the vehicle, but rather can also be provided in the rescue center, can be provided in the data storage unit or connected to the rescue center via the internet.

For example, relief units such as police, fire department or rescue service and/or their equipment can be regarded as aid means appropriate to the accident type. The aid means can also be a towing service or its equipment. In particular, an ambulance, a helicopter, a tow truck, a crane, appliances of the fire department or of the technical relief agency such as an equipment truck, a traffic control system or a rescue cutter can be regarded as aid means appropriate to an accident type.

The wireless data and/or voice connection can be a cell telephone connection, which is configured for example according to at least one GSM standard, in particular according to the standard GSM2 (2G), GSM3 (3G), GSM4 (G4, LTE) and/or GSM 5 (G5). The wireless data and/or voice connection can be, for example, a cell telephone connection which is established in the context of or respectively according to an eCall, described in the introduction. It can also be established in the context of an ERA GLONASS emergency call. The features described in the introduction for eCall and ERA GLONASS are referred to at this point for the present invention.

The wireless data and/or voice connection can comprise, in particular, connections according to at least one of the standards or respective protocols of General Packet Radio Service (GPRS), Enhanced Data Rates for GSM Evolution (EDGE), Universal Mobile Telecommunications System (UMTS), Code Division Multiple Access (CDMA), Wideband CDMA (WCDMA), LTE, LTE-Advanced, 5G or their successor technologies or a Car to Infrastructure (C2I) technology. It can also comprise Short Message Service (SMS) messages.

The wireless data and/or voice connection can in particular comprise connections according to at least one of the standards or respectively protocols Wireless Local Area Network (WLAN or respectively pWLAN (802.11p)), Transmission Control Protocol/Internet Protocol (TCP/IP), User Datagram Protocol (UDP), Hypertext Transfer Protocol (http), Hypertext Transfer Protocol Secure (https).

The independent data storage unit can be provided in particular in an address-based computer network. The contact information transmitted from the vehicle to the rescue center can comprise in particular a telephone number of a cell telephone situated in the vehicle. It can in particular comprise a connection number of a SIM card, which is integrated in a mobile radio device installed permanently in the vehicle. The contact information can comprise a network address of the computer network assigned to the data storage unit, for example an internet (URL), an IP, an http and/or an https address. Via the corresponding network connection in particular a secured, encrypted data transmission can take place. The contact information can comprise in particular an address such as a URL or respectively a hyperlink to the data storage unit or respectively to a computer, in particular to a backend server.

The data and/or data derived therefrom retrieved by the rescue center from the independent data storage unit can be transmitted by the rescue center to a relief unit facility, for example to a computer of a police station house or to a firehouse, to a control unit of an emergency vehicle or to another mobile apparatus such as e.g. a multifunctional cell phone (Smart Phone), laptop, tablet PC etc.

In a further, advantageous example embodiment of the invention, the second sensor data comprise vehicle contact information, for example a telephone number and/or at least one network address such as URL, IP, http, https etc. In particular by means of the respective vehicle contact information, a further wireless data and/or voice connection to the vehicle involved in the accident and/or to a computer assigned to the vehicle, for example the backend server, can be established from the rescue center.

In the scope of the invention provision can be made in particular that the first connection is initiated from the vehicle and establishes only a unidirectional data connection to the rescue center. It can be a pure voice connection, a pure data connection or a voice and data connection. For the use of the first connection, provision can be made that only a relatively short message, in particular an SMS message, is transmitted from the vehicle to the rescue center. The second connection can be, in particular, a bidirectional connection. It can be a pure voice connection or a voice and data connection. It can, in particular, be initiated from the rescue center.

In a further advantageous example embodiment of the invention, the second sensor data stored in the independent data storage unit are secured such that they cannot be changed, but only retrieved, by the rescue center.

Within the scope of the invention, an emergency call device for a vehicle can also be indicated, which is arranged in order to establish, after an accident of the vehicle, a wireless data and/or voice connection automatically between the vehicle and a rescue center, wherein first sensor data ascertained by means of at least one first sensor in the vehicle are transmitted to the rescue center. The device is configured such that it automatically transmits to a data storage unit, independent of the rescue center, second sensor data detected by the first sensor and/or by at least one second sensor provided in the vehicle, and via the wireless data and/or voice connection, contact information assigned to the data storage unit is transmitted from the vehicle to the rescue center, so that the rescue center can retrieve the second sensor data and/or data derived therefrom stored in the independent data storage unit using the contact information, wherein the retrieved data are suitable for selecting aid means appropriate to the accident type.

In the emergency call device in particular a first control unit can be provided, which is arranged for the output of the first sensor data and of the contact information to the rescue center, and a second control unit, functionally independent of the first control unit, which second control unit is arranged in order to transmit at least the second sensor data to the data storage unit. Here, the first sensor data and, if applicable, further data can also be transmitted to the data storage unit.

The first control unit can have in particular control components which are configured according to a standardized emergency call system, for example according to the European eCall standard or according to the ERA GLONASS standard. The second control unit, functionally independent of the first control unit, can have in particular individual control components which are vehicle-specific and/or specific to the vehicle manufacturer.

The emergency call device is in particular arranged to entirely or partially carry out method steps which are described in this document.

Within the scope of the invention, a vehicle can also be indicated, which comprises an emergency call device described in this document, and an emergency call system, which comprises a rescue center and an emergency call device described in this document.

The invention can also be realized in a computer program product which by loading and executing on a computer carries out entirely or partially a method described in this document.

Further example embodiments of the invention are explained in further detail below with the aid of a FIGURE.

Other objects, advantages and novel features of the present invention will become apparent from the following detailed description of one or more preferred embodiments when considered in conjunction with the accompanying drawings.

BRIEF DESCRIPTION OF THE DRAWINGS

The FIGURE shows an emergency call system for a motor vehicle.

DETAILED DESCRIPTION OF THE DRAWINGS

In the emergency call system 1 illustrated in FIG. 1 a telematics unit (TE) 5 is provided in a motor vehicle 2, which telematics unit is connected in-vehicle by data systems technology via a databus system 8 to an electronic control unit (ECU) 4 and which is connectable via a mobile radio connection 6 to at least one computer external to the vehicle, for example to a rescue center computer (RLC) 9 and/or to a backend computer (BE) 7, which is operated for example by a service provider or by the manufacturer of the motor vehicle 2 independently of the rescue center computer 9. The operation can take place for example in a call center. The mobile radio connection 6 can take place in particular via corresponding mobile radio components, which correspond to a mobile radio standard, for example at least to one of the GSM standards GSM2, GSM3, GSM4 and GSM5.

The mobile radio connection 6 can also be established entirely or partially by means of another radio standard, such as e.g. WLAN. The connections 6a and 6b can be configured respectively as a data and/or voice connection.

The mobile radio components can comprise conventional components, known per se, in connection with or respectively within the telematics unit 5, for example a SIM card (Subscriber Identity Module), a transmitting- and/or receiving antenna, a mobile radio chip, in which respective control software for the mobile radio standard is stored, etc. Outside the vehicle, the mobile radio components can comprise for example a radio base station of a cell telephone radio network and/or electronic transmission and/or receiving components for WLAN signals. By means of the corresponding mobile radio infrastructure, from the telematics unit 5 of the motor vehicle 2 a data connection 6a can be established to the backend computer 7 and/or a data connection 6b to the rescue center computer 9 in an entirely or partially cabled manner. Also, an entirely or partially cabled or respectively an entirely or partially wireless data connection can be established between the backend computer 7 and the rescue center computer 9.

The data bus system 8 can comprise for example a Controller Area Network Bus (CAN bus), a Media Oriented Systems Transport (MOST bus) and/or an Ethernet bus. Via the data bus system 8 data can also be transmitted between the control unit and sensors 3, 3a, 3b, 11 permanently installed in the vehicle. The sensors 3 comprise at least two accident-relevant sensors (crash sensors) 3a (S1) and 3b (S2), by which respectively events are able to be detected which are suggestive of an accident. A crash sensor can also be used in particular to activate an accident safety system such as e.g. a belt tensioner, an airbag or a pedestrian protection device of the motor vehicle 2. Furthermore, a GPS sensor 11 is provided, by which the vehicle position is able to be determined. It is also possible that in the motor vehicle 1 a sensor is provided or respectively installed, which combines the tasks of the illustrated sensors 3a (S1) and 3b (S2).

The telematics unit 5 comprises first components, in particular components controlled by software and/or components comprising software, which are arranged for establishing the data connection 6b between the motor vehicle 2 and the computer 9 of the rescue center (designated Call Center for Emergency Calls in English, also Public Safety Answering Point, PSAP) which is operated in particular by a public facility. In these components for example the Euro emergency call number 112 is stored. These first components can be configured in particular so that they fulfil specifications set legally and/or according to the standard or respectively rule in the context of the eCall and/or by ERA GLONASS.

The telematics unit 5 comprises second components, in particular components controlled by software and/or components comprising software, which are arranged for establishing the data connection 6A between the motor vehicle two and the backend computer 7. In these components for example connection information is stored for the establishing of a data and/or voice connection between the motor vehicle 2 and the backend computer 7. The connection information can comprise a telephone number. It can also comprise a computer network address.

In the telematics unit 5 furthermore at least one component (e.g. software and/or data storage unit) is provided, in which contact information is stored for establishing a data and/or voice connection between the rescue center computer 9 and the backend computer 7. The contact information can in particular comprise a telephone number and/or a computer network address. The telematics unit 5 comprises in particular a component by which the contact information is transmitted in the context of a data transmission from the telematics unit 5 to the rescue center computer 9. The transmission can take place for example in the context of eCall through at least one data field specific to the vehicle manufacturer, which is specified there.

A possible application for the emergency call device provided with the telematics unit 5 is described below, in which an eCall is triggered.

When the motor vehicle 2 has an accident and/or a corresponding emergency call signal is transmitted from the control 4 (or from another vehicle control) to the telematics unit 5, data are then generated, processed and/or detected in the motor vehicle 2 by means of the vehicle sensors 3, 3a, 3b, 11, of the vehicle control 4 and/or of the telematics unit 5. The data can also comprise data already generated, detected and/or processed before the accident event and/or after the accident event.

A first portion of the data, namely at least the minimum data legally designated for an eCall, is transmitted in the context of the eCall to the computer 9 of the rescue center. The eCall minimum data comprise for example the chassis number (Vehicle Identification Number, VIN) stored in the vehicle, the current location of the vehicle (accident location, GPS coordinates) detected e.g. by means of a GPS sensor 11, the direction of travel detected e.g. by GPS, etc.

A second portion of the data generated, processed and/or detected in the vehicle, so-called manufacturer-specific accident data, is not transmitted from the telematics unit 5 to the computer 9, but rather is transmitted to the backend computer 7 and is stored there for example temporarily and/or permanently in a data storage unit (DS) 7a. For example, these data can comprise data generated, detected and/or processed by means of the accident sensors 3a, 3b of the motor vehicle 2, which are functionally in connection with at least one accident safety system such as a restraint system, an airbag and/or a pedestrian protection system. They can also comprise further data, for example relating to the number of vehicle occupants and detected by means of other sensors such as e.g. a vehicle interior camera. The data transmitted from the telematics unit 5 to the backend computer 7 can be further processed or respectively prepared there, and the thus processed data can be likewise stored.

By means of the above-mentioned first components of the telematics unit 5, an eCall emergency call is transmitted to the rescue center computer 9 via the data connection 6b when at least one of the two sensors 3a, 3b generates an accident signal. The eCall emergency call is a data connection in which the eCall minimum data are transmitted from the motor vehicle 2 to the rescue center. Furthermore, a network address, for example a URL, of the backend computer 7 is transmitted as contact information for the rescue center to its computer 9, under which address the rescue center can retrieve via the data connection 10 the manufacturer-specific accident data from the backend computer 7.

The data connection 10 for transmitting of the URL data can be established here via a computer network connection 12, in particular via the internet. The URL is typically generated in the motor vehicle 2. The URL could also be generated in the backend computer 7, messaged via the data connection 6a to the motor vehicle 2 as a hyperlink and transmitted from there via the data connection 10 to the rescue center. The URL contains an identifier clearly identifying the vehicle which has had the accident, for example the chassis number (Vehicle Identification Number, VIN) or a part thereof clearly identifying the vehicle. Furthermore, the URL can contain a clear identifier which identifies the current event (e.g. emergency call or respectively accident). Such a URL can have, for example, the following corresponding structure: https://psap.bmwgrou.net/?VIN=AB12345&Event=abcdefgh123456789.

Here, AB12345 designates at least a portion of the chassis number and abcdefgh123456789 designates an identifier for identifying the accident event.

The URL is transmitted from the motor vehicle 2 to the rescue center. From the rescue center then the manufacturer-specific accident data of the current accident of the motor vehicle 2 can be retrieved from the backend computer 7 by means of the transmitted network address or respectively URL of the backend computer 7 and the data connection 10. The retrieved data can comprise inter alia sensor data and/or processed or respectively prepared data. The data are transmitted here to the rescue center computer 9. Access can take place in particular by means of a commercially available internet browser, such as e.g. Internet Explorer, installed on the computer 9. It can also take place by means of an interface arranged specifically for this. The transmitted data can be graphically prepared and displayed in a graphic application installed on the rescue center computer 9. Via the data connection 10 or respectively the network 12 a voice connection can also be established between the rescue center and the call center, which is organizationally and/or locally independent thereof, in which the backend computer 7 is situated.

In particular in the backend computer 7 a computer program can run which calculates an accident severity from available vehicle- or respectively manufacturer-specific accident information, derived in particular from data from vehicle sensors, by means of a suitable predetermined algorithm, and forms output data therefrom, by means of which the accident type, the severity of the accident etc. can be presented to the rescue center for example by means of images, symbols etc. in a visually easily understandable manner.

On the basis of the collected data, i.e. the eCall minimum data, the manufacturer-specific accident data and/or output data formed therefrom, the rescue center can then assess which aid means are required and, on the basis thereof, alert corresponding relief units and request in a targeted manner the suitable aid means appropriate to the respective accident type, for example an ambulance, a rescue cutter and/or a tow truck with a crane. Thereby, these aid means can be provided promptly for the accident victims and for the motor vehicle 2 which is involved in the accident, and, if applicable, additional vehicles from the relief units such as e.g. emergency services, fire department and/or police.

An emergency call signal triggering an emergency call can be generated in particular after one of the crash sensors 3a, 3b signals an accident. However, it can also be generated by means of an electrical, in particular electromechanical emergency call switch provided in the motor vehicle 2, which is operable manually by the vehicle driver.

In the motor vehicle 2 further components can be provided, not shown in the FIGURE, which are usable in connection with the described invention. For example, a hands-free device can be provided in the passenger compartment, via which a voice connection to the vehicle driver and/or to passengers of the vehicle can be established with the rescue center and/or with the call center operated by the vehicle manufacturer.

Via the telematics unit 5 a variety of operating data of the motor vehicle 2 can be transmitted to the backend computer 7 and/or to the rescue center computer 9, which are detected and/or generated in the vehicle by means of data processing before, during and/or after the accident event.

The described equipment and system components are controlled in particular by computer programs and can have, in addition, further elements of computers and digital control units known per se, such as a microprocessor, volatile and non-volatile memories, interfaces etc. The invention can therefore also be realized entirely or partially in the form of a computer program product, which by loading and executing on a computer brings about, entirely or partially, a process according to the invention. For example, it can be provided in the form of a data medium such as a CD/DVD or else in the form of one or more files on a server, from which the computer program is able to be downloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing aid after a vehicle accident involving a vehicle, the method comprises:
    establishing, via an emergency call device of the vehicle after the vehicle accident, a wireless data and/or voice connection between the vehicle and a rescue center;
    transmitting first sensor data, ascertained via at least one first sensor in the vehicle, to the rescue center;
    transmitting second sensor data detected by the at least one first sensor and/or by at least one second sensor of the vehicle to a vehicle-manufacturer-specific data storage unit independent of the rescue center wherein the second sensor data is stored by the vehicle-manufacturer-specific data storage unit;
    transmitting, via the wireless data and/or voice connection, contact information assigned to the vehicle-manufacturer-specific data storage unit from the vehicle to the rescue center;
    retrieving, by the rescue center using the contact information, the second sensor data and/or data derived therefrom stored in the vehicle-manufacturer-specific data storage unit; and
    selecting aid appropriate to a type of the vehicle accident based on the retrieved data.

2. The method as claimed in claim 1, wherein the vehicle-manufacturer-specific data storage unit is provided in an address-based computer network, and wherein the contact information transmitted from the vehicle to the rescue center comprises a network address assigned to the vehicle-manufacturer-specific data storage unit.

3. The method as claimed in claim 2, wherein the second sensor data comprise vehicle contact information, and wherein a further wireless data and/or voice connection is established from the rescue center to the vehicle using the vehicle contact information.

4. The method as claimed in claim 2, wherein the second sensor data stored in the vehicle-manufacturer-specific data storage unit are secured such that they cannot be changed by the rescue center.

5. The method as claimed in claim 1, wherein the second sensor data comprise vehicle contact information, and wherein a further wireless data and/or voice connection is established from the rescue center to the vehicle using the vehicle contact information.

6. The method as claimed in claim 1, wherein the second sensor data stored in the vehicle-manufacturer-specific data storage unit are secured such that they cannot be changed by the rescue center.

7. The method as claimed in claim 1, wherein the second sensor data is manufacturer-specific accident-relevant data concerning the vehicle accident.

8. The method as claimed in claim 1, wherein the vehicle-manufacturer-specific data storage unit is operated by or for a manufacturer of the vehicle.

9. An emergency call device for a vehicle, configured to:
establish, after a vehicle accident involving the vehicle, a wireless data and/or voice connection between the vehicle and a rescue center;
transmit first sensor data, ascertained via at least one first sensor in the vehicle, to the rescue center;
transmit second sensor data detected by the at least one first sensor and/or by at least one second sensor of the vehicle to a vehicle-manufacturer-specific data storage unit independent of the rescue center, wherein the second sensor data is stored by the vehicle-manufacturer-specific data storage unit; and
transmit, via the wireless data and/or voice connection, contact information assigned to the vehicle-manufacturer-specific data storage unit from the vehicle to the rescue center,
wherein aid appropriate to a type of the vehicle accident is selectable based on the second sensor data and/or data derived therefrom that is stored in the vehicle-manufacturer-specific data storage unit, which is retrieved by the rescue center using the contact information.

10. The emergency call device as claimed in claim 9, wherein the emergency call device comprises:
a first control unit configured to transmit the first sensor data and the contact information to the rescue center, and
a second control unit, functionally independent of the first control unit, configured to transmit at least the second sensor data to the vehicle-manufacturer-specific data storage unit.

11. The emergency call device as claimed in claim 10, wherein the second sensor data comprise vehicle contact information, and wherein a further wireless data and/or voice connection is established from the rescue center to the vehicle using the vehicle contact information.

12. The emergency call device as claimed in claim 9, wherein the vehicle-manufacturer-specific data storage unit is provided in an address-based computer network, and wherein the contact information transmitted from the vehicle to the rescue center comprises a network address assigned to the vehicle-manufacturer-specific data storage unit.

13. The emergency call device as claimed in claim 9, wherein the second sensor data comprise vehicle contact information, and wherein a further wireless data and/or voice connection is established from the rescue center to the vehicle using the vehicle contact information.

14. The emergency call device as claimed in claim 9, wherein the second sensor data stored in the vehicle-manufacturer-specific data storage unit are secured such that they cannot be changed by the rescue center.

15. The emergency call device as claimed in claim 9, wherein the second sensor data is manufacturer-specific accident-relevant data concerning the vehicle accident.

16. The emergency call device as claimed in claim 9, wherein the vehicle-manufacturer-specific data storage unit is operated by or for a manufacturer of the vehicle.

17. An emergency call system comprising:
an emergency call device as claimed in claim 9;
a computer of the rescue center; and
the vehicle-manufacturer-specific data storage unit,
wherein the computer of the rescue center is configured to retrieve the second sensor data stored in the vehicle-manufacturer-specific data storage unit using the contact information, and wherein the vehicle-manufacturer-specific data storage unit is configured to store and transmit the second sensor data.

\* \* \* \* \*